: 3,847,890
ACIDIC MONOSACCHARIDE-SUBSTITUTED PROTEINS

Allan M. Green, P.O. Box 18038, Cleveland Heights, Ohio 44118 and Jack Pensky, 7560 Chagrin Road Falls, Chagrin Falls, Ohio 44022
No Drawing. Filed Nov. 1, 1971, Ser. No. 194,541
Int. Cl. A61k 17/02; C07c 103/52; C07g 7/00
U.S. Cl. 260—112.5     1 Claim

ABSTRACT OF THE DISCLOSURE

New compounds with novel properties synthesized by substituting proteins or polypeptides at their available α-amino groups or ε-amino groups, with acidic nonosaccharides possessing vicinal hydroxyl groups, therapeutic compositions including these new compounds; and methods of using these therapeutic compositions. Acid monosaccharides-substituted insulin compounds have activity in increasing mitochondrial swelling, increasing sugar transport into muscle, and lowering serum blood sugar.

BACKGROUND OF THE INVENTION

This invention relates to novel therapeutic compounds. More particularly, it relates to acid monosaccharide-substituted proteins and polypeptides, therapeutic compositions containing them, and methods of using them. Specifically, this invention describes several insulins, human growth hormone, human serum albumen, bovine serum albumen and the proteins of a human pituitary homogenate all of which are substituted at α-amino or ε-amino groups with N-acetylneuraminic acid or gluconic acid. Therapeutic compositions containing these new compounds are described.

Prior to this invention, the use of certain proteins and polypeptides for the treatment of disease was well-known. For instance, insulins have long been widely used in the treatment of diabetes; similarly, human growth hormone has been used in the treatment of pituitary insufficiency. Unfortunately, however, it was equally well-known that many diabetics developed antibodies to insulin preparations and eventually required as much as 30 to 40 times the common dose of insulin to control their hyperglycemia. Furthermore, it was well-known that there might be wide swings in the insulin requirements of these patients as antibody levels changed such that it was difficult to administer a consistently safe dose of insulin. Simiarly, it was well-known that patients with pituitary insufficiency receiving human growth hormone therapeutically developed antibodies to the administered hormone that interfered with its activity. Many other examples of interference by antibodies with the therapeutic goals of parenterally administered proteins and polypeptides can be cited.

The importance of abolishing interactions of proteins and polypeptides with antibodies that bind them and render them ineffective is obvious and well-recognized in the art. Aside from lessening the required dose of injected material, the dangerous dosage variations necessitated by fluctuating antibody levels would be avoided with less antigenic material. Further, in some cases—as with human growth hormone—antibodies that render material totally ineffective therapeutically would not interact to the same extent with less antigenic material. The instant compounds are formed by reacting proteins or polypeptides through one of the vicinal hydroxyl groups of acidic monosaccharides and not through an acyl group. Surprisingly the acidic monosaccharides used to form the instant compounds appear to use the carboxyl group as a blocking group rather than a reacting moiety. The fact that carbohydrate substitution had any effect at all either in the reaction of the molecule or in the behavior of the acidic monosaccharide-substituted protein is indeed surprising. For example, it is well-known that the naturally occurring carbohydrate units of proteins are not known to have any particular function. Thus, ribonuclease B differs from ribonuclease A by containing a carbohydrate unit, but the two enzymes have the same activity (see J. Biol. Chem. 238:1396, 1963, by Plummer and Hirs). Again, it is known that bovine β-galactosaminidase has multiple forms which differ primarily in their carbohydate content and yet show no significant difference in specific activity (Biochemistry 6:3767, 1967, by Plapp and Cole). It is also known that the transport function of the plasma glycoproteins such as haptoglobulin, transferrin and thyroxine-binding globulin is not affected by the removal of sialic acid with neuraminidase (Biochem. Biophys. Acta, 50:90, 1961, by Blumberg and Warren).

It is interesting to note that in the Preface of his book entitled Glycoproteins, edited by Dr. Alfred Gottschalk, the author states, "From laboratory work on this topic it had become quite clear to me that the preparation, the quantitative analysis, and the elucidation of structural features of 'mucoproteins' (or glycoproteins) involve difficulties not met at all or at least not to the same extent in the study of proteins and polysaccharides." It is all the more surprising, therefore, that in view of the fact that "In glycoproteins so far investigated sialic acid, if present, invariably occupies a non-reducing terminal position within the heterosaccharide, and so far only galactose and N-acetylgalactosamine have been found as natural partners in the ketosidic linkage" (see bottom of page 263, Gottschalk, supra), the acidic monosaccharides directly react with the proteins as they do, and having done so exhibit the surprisingly property of essentially eliminating the antigenicity of the naturally occurring protein.

SUMMARY OF THE INVENTION

It has been discovered that such acidic monosaccharides substituted onto α-amino or ε-amino groups of proteins or polypeptides whose biologic activity does not depend upon free amino groups results in a product which is biologically active, but which has altered affinity for antibodies to the native protein.

It is an object of this invention, therefore, to provide new therapeutic protein and polypeptide compounds and compositions whose interaction with antibodies to native protein and polypeptides is unexpectedly diminished or essentially eliminated, and which can be employed in the treatment of pathologic states such as hyperglycemia or pituitary insufficiency, the treatment of which by conventional methods is hindered by antibodies to the native therapeutic agent.

It has been discovered that the antigenicity of proteins the biological activity of which is not related to their free amino groups, can be reduced by a factor of at least 3, by reacting the proteins with an acid monosaccharide which has vicinal hydroxyl groups.

PREFERRED EMBODIMENT

The instant acidic monosaccharide-substituted protein or polypeptide is a protein or polypeptide which has an acid monosaccharide having at least one carboxyl group with vicinal hydroxyl groups linked to it through an α-amino or ε-amino group. Preferred acidic monosaccharide-substituted proteins have from one to about three carboxyl groups. Artificial polysaccharide-substituted proteins, unlike the instant compounds, are water-insoluble and have no desirable therapeutic value.

By reason of the present invention, products are made available which are essentially comprised of α-amino and ε-amino acid monosaccharide-substituted proteins and polypeptides which provide similar bilogic and therapeutic activities as the native proteins and polypeptides but which show surprisingly different affinity to antibodies which bind the native material. Parenterally acceptable compositions of the new acid monosaccharide-substituted proteins and polypeptides are also described.

Among the suitable proteins and polypeptides of human origin, animal origin or synthetic design which may be employed in this invention, the following examples may be mentioned: the various insulins obtained from the pancreas glands of pigs, cattle, whales, fish and others; the human growth hormone; the albumins of the sera of humans, cows and others; the proteins and polypeptides of the human pituitary gland. In a particular embodiment, as described below, porcine insulin substituted with N-acetylneuraminic[1] acid or with gluconic acid at its $a$-amino groups or its $\epsilon$-amino group retains biological activity, while substantially eliminating its tendency to be bound by ani-porcine insulin antibody. The cause of this loss of antigenicity is not fully understood, although it is postulated to be the result of steric hindrance afforded the new protein or polypeptide compound by the sugar group of an altered charge distribution at the molecular surface, of increased molecular rigidity due to an increased number of repelling negative charges at the molecular surface, or of increased solubility in aqueous solution at physiologic pH due to the change in charge distribution at the molecular surface.

The preparation of the instant compounds may be effected from any protein or polypeptide which has the aforementioned functional groups and involves two stages: (i) the formation of a reactive intermediate by treating an acid monosaccharide with vicinal hydroxyl groups for a short period with aqueous cyanogen halide solution under alkaline conditions; and (ii) coupling the intermediate with a protein or polypeptide in aqueous medium. After a brief period of mixing, uncoupled monosaccharide and cyanogen bromide and reaction side products can be eliminated using any of a number of conventional techniques well-known to those in the art such as dialysis, ultrafiltration of gel filtration.

The pH at which the coupling of the activated intermediate to the protein or polypeptide is performed will, in part, determine the degree of coupling, since it is the unprotonated form of the amino group which is reactive. Thus, proteins and polypeptides containing an $\alpha$-amino group such as phenylalanine will couple optimally at a pH of about 9.5 to 10.0. Compounds possessing an $\alpha$-amino group of lysine will couple best at a pH of 10 to 10.5 in an excess of intermediate.

In addition to using the acid monosaccharide-substituted products to this invention per se in therapeutic treatment, various complexes and compositions thereof may be employed to affect the time of action and to affect the absorption of these protein and polypeptide derivatives. An example of such compositions is the reaction of acid-monosaccharide-substituted insulin with a zinc salt such as zinc chloride, preferably in the presence of a buffering agent such as an organic acid, and an alkali metal hydroxide whereby a zinc-acid monosaccharide-substituted insulin is obtained. Similarly, an acid monosaccharide-substituted insulin may be reacted with a zinc salt such as the above plus an alkali protein such as protamine, histone or globin such that a protamine, histone or globin-acid-monosaccharide-substituted insulin is obtained. The preparation of complexes and compositions utilizing fine salts and alkali proteins is well-known in the art. In addition, any other method known in the art whereby the isoelectric point of the acid monosaccharide-substituted protein or polypeptide is raised to that of the pH of the blood may be used.

The following examples further illustrate the invention:

EXAMPLE 1

N-acetylneuraminyl insulin (porcine)

Insulin (porcine) from Mann Research Labs (24.4

[1] Also referred to as sialic acid.

USP units per milligram) is used in this synthesis. N-acetylneuraminic acid (commonly called sialic acid) is obtained from Calbiochem; cyanogen bromide is obtained from Eastman Organic Chemicals. Cyanogen bromide (210 mg.) is dissolved in 5 milliliters of distilled water with stirring. N-acetylneuraminic acid (175 mg.) is added to this and dissolved. The reaction mixture is then brought to pH 10.5 with 0.2 molar potassium hydroxide. As the reaction proceeds, the pH tends to become more acid; and it is maintained between pH 9.5 and pH 10.5 throughout the activation by addition of appropriate amounts of 0.2 M potassium hydroxide. The reaction continues until the pH stops falling. The temperature during the activation phase is maintained at about 20° C. by the addition of small chunks of ice. When the reaction is completed as shown by the tendency for the pH to maintain itself at about 10, the reaction vessel is placed in ice, and the pH of the reaction mixture is brought to 8.6 by the addition of 0.06 M Tris[2] buffer, pH 8.6. The insulin (5.5 mg.) is then added to the reaction mixture and dissolved with stirring. The mixture is then exhaustively dialyzed at 4° C. against changes of ice-cold 0.05 M Tris, pH 7.4.

The product migrates more rapidly than native insulin on disc gel electrophoresis, pH 8.4–8.6. It forms a single distinct band migrating near the electrophoretic front and at least two fainter bands moving somewhat slower. N-acetylneuraminic acid can be detected as associated with the exhaustively dialyzed product by performing the thiobarbituric acid assay which is said to be specific for the neuraminic acids (Warren, L., J. Biol. Chem. 234: 1971 (1959)). When radioactive insulin labeled with Iodine–125 is incorporated into the reaction mixture, coupled with N-acetylneuraminic acid, chromatographed on disc gels and radioautographed, almost all of the radioactivity is shown to migrate in a single ban moving toward the anode faster than native insulin, as expected with more negatively charged groups at the surface of the molecule.

The N-acetylneuraminylinsulin retains biological activity as demonstrated by its stimulation of glucose uptake by rat diaphragm in vitro, by its effect on the swelling of mitochondria, and by its hypoglycemic activity.

Diaphragms are obtained from male Sprague-Dawley rats and divided in half. They are incubated for three hours in Krebs-Ringer bicarbonate buffer (pH 7.3) containing 10 mM glucose and radioactive $^{14}C$-glucose. The incubation mixture is kept at 37° C. and shaken on a Dubnoff shaker during the incubation. After the incubation, aliquots of supernatant are taken from the incubation fluid and their radioactive activity determined in a scintillation counter. The counts shown in the table below are corrected to c.p.m. per milligram wet weight of diaphragm.

[2] Tris refers to tris-hydroxy methyl amino methane.

TABLE 1

$^{14}C$-glucose activity after incubation with rat hemidiaphragms in the presence of insulin

| Exp. No. | Flask No. | Hemi-diaphragm weight, g. | Additions to buffer | C.p.m./mg. remaining after incubation |
|---|---|---|---|---|
| 1 | 1 | 1.288 | 25 µl. native insulin (1 mg./ml.). | 12,900 |
|  | 2 | 1.279 | 25 µl. NANA-insulin (1.4 mg./ml.). | 13,946 |
| 2 | 1 | 0.357 | 25 µl. native insulin (1 mg./ml.). | 39,924 |
|  | 2 | 0.395 | 25 µl. NANA-insulin (1.4 mg./ml.). | 40,820 |
| 3 | 1 | 1.003 | No addition | 18,282 |
|  | 2 | 1.232 | 25 µl. NANA-insulin (1.4 mg./ml.). | 12,626 |

Thus, this experiment shows N-acetylneuraminylinsulin to be about 70% as active as native insulin.

Insulin has been shown to affect the rate of swelling of isolated mitochondria; and this has been used as an assay of insulin activity (Fenichel, R. L. et al. Biochemistry, 5 (1966) 461). Mouse liver mitochondria are prepared by the usual method of differential centrifugation well-known to those in the art. They are resuspended in 0.125 M KCl–0.02 M Tris–0.1% gelatin at pH 7.3. The effect of insulin on mitochondrial swelling is followed by measuring changes in light absorption at 520 mμ in a Beckman DU spectrophotometer using 0.7 cm. capacity quartz cuvettes with a 1 cm. path length.

The data is shown in Table 2.

TABLE 2

The effect of varying concentrations of N-acetylneuraminylinsulin on the swelling of mouse liver mitochondria

| μl. of N-acetylneuraminyl-insulin (0.54 mg./ml.) per 0.5 ml. MIT | Change in O.D. units 520 mμ* | | | | |
|---|---|---|---|---|---|
| | 5' | 10' | 15' | 20' | Total |
| 20 μl | 1 | 11 | 4 | 5 | 21 |
| 40 μl | 6 | 12 | 5 | 8 | 31 |
| 60 μl | 15 | 14 | 10 | 11 | 50 |

*The O.D. unit equals O.D. change of 0.001.

This experiment illustrates the dose-dependency of the effect of N-acetylneuraminylinsulin on mitochondrial swelling. The same experiment performed to compare the efficacy of 20 μl native insulin (1 mg./ml.) with that of 60 μl. N-acetylneuraminylinsulin (1 mg./ml.) on mitochondrial swelling when added to identical solutions of mouse liver mitochondria showed the change in O.D. at 520 mμ with native insulin at the end of 60 minutes was 294 units compared with a change of 264 units for N-acetylneuraminyl insulin. Thus, the activity of the insulin of the present invention is nearly the same as that of native insulin by this test.

Finally, the hypoglycemic effect of N-acetylneuraminylinsulin was demonstrated by injecting it intravenously into albino rabbits. The fastening plasma glucose level in a 2300 gram albino rabbit was determined to be 144 milligrams per 100 ml. of plasma (mg. percent). A solution of 0.05 mg. N-acetylneuraminylinsulin in 0.1 ml. saline was injected into the rabbit intravenously. By 20 minutes, the plasma glucose had fallen to 123 mg. percent; at 30 minutes its value was 109 mg. percent. It then started to rise, reading 118 mg. percent at 45 minutes, 129 mg. percent at 90 minutes, and 137 mg. percent after 160 minutes. Thus, N-acetylneuraminyl insulin is shown to have hypoglycemic activity.

Finally, the antigenicity of N-acetylneuraminylinsulin was compared to that of native insulin by comparing the activities of solutions of the hormones by the radioimmunoassay technique of Berson and Yalow (J. Clin. Invest. 39:1157 (1960)). Repeated determinations on solutions containing known amounts of native insulin and N-acetylneuraminylinsulin showed that the insulin derivative of the present invention had less than 1% as much antigenic activity as the native insulin.

EXAMPLE 2

N-acetylneuraminylinsulin (bovine)

Following the example of procedure 1, but substituting 5.5 mg. of bovine insulin for the porcine insulin, N-acetylneuraminyl insulin (bovine) is obtained.

EXAMPLE 3

Gluconylinsulin (porcine)

300 mg. cyanogen bromide is dissolved in 5.0 ml. distilled water with stirring. Potassium gluconate (115 mg.) is then added and dissolved with stirring. The pH of the solution is brought to 10.5 by the addition of 0.2 M potassium hydroxide. As the reaction proceeds, the pH shows a tendency to fall and is maintained between 9.5 and 10.5 by the addition of 0.2 M potassium hydroxide. When the reaction is completed, as shown by a tendency for the pH to maintain itself at alkaline levels, the pH is adjusted to 8.6 by the addition of 0.06 M Tris, pH 8.6. The reaction vessel is placed in ice and recrystalled porcine insulin (5.50 mg.) is added with stirring. When the insulin is dissolved, the reaction mixture is placed in dialysis tubing and dialyzed exhaustively at 4° C. against changes of 0.06 M Tris, pH 7.4. Analytic disc gel electrolysis of the gluconylinsulin preparation demonstrates a single band migrating anodally more rapidly than native insulin, as expected due to the increased negative charge density of the gluconylinsulin. The gluconylinsulin preparation also demonstrates less rapid anodally migrating products.

The gluconylinsulin is active in the mouse mitochondrial swelling assay described in Example 1. 20 μl. of a 0.5 mg./ml. preparation of glyconylinsulin caused a fall in optical density at 520 mμ of 202 at the end of 20 minutes compared to a fall of 130 units caused by 20 μl. of control porcine insulin in the same time.

Radioimmunoassay of gluconylinsulin showed it to possess less than 2% of the affinity for antiporcine insulin antibodies than native porcine insulin.

EXAMPLE 4

Gluconylinsulin (bovine)

Following the procedure of Example 3, but substituting 5.50 mg. of bovine insulin for the porcine insulin, gluconylinsulin (bovine) is obtained.

EXAMPLE 5

N-acetylneuraminyl human cerum albumin

Cyanogen bromide (280 mg.) is dissolved with stirring in 10 ml. distilled water. N-acetylneuraminic acid (30 mg.) is then dissolved with stirring. The pH is raised to 10.5 by addition of 0.2 M potassium hydroxide and maintained between pH 9.5 and 10.5 by addition of 0.2 M potassium hydroxide. When the reaction was complete— as shown by a tendency for the pH to maintain alkaline levels—the solution was transferred to ice, the pH adjusted to 8.6 by the addition of 0.06 M Tris, pH 8.6, and 500 mg. of human serum albumin dissolved in 5 ml. 0.9% sodium chloride is added. The reaction mixture is stirred for 5 minutes, then transferred to dialysis tubing and exhaustively dialyzed against changes of 0.06 M Tris, pH 7.4 at 4° C.

The product migrates as a single band more rapidly anodally than native human serum albumin when analyzed by cellulose acetate electrophoresis using buffer, pH 8.6. This continues the increased negative charge density at the molecular surface of the derivative.

N-acetylneuraminylalbumin may be used as an expander of intravascular plasma volume to treat hypovolemia by dissolving it in a solution of 0.9% sodium chloride and administering 10 to 100 grams intravenously.

EXAMPLE 6

N-acetylneuraminyl bovine serum albumin

Following the procedure of Example 5, but substituting 500 mg. bovine serum albumin for the human serum albumin, N-acetylneuraminyl bovine serum albumin is obtained.

EXAMPLE 7

Gluconyl human serum albumin

Following the procedure of Example 5, but substituting 50 mg. potassium gluconate for the N-acetylneuraminic acid, gluconyl human serum albumin is obtained.

EXAMPLE 8

N-acetylneuraminyl human growth hormone

Cyanogen bromide (205 mg.) is dissolved with stirring in 2.0 ml. distilled water. N-acetylneuraminic acid (28 mg.) is dissolved in the cyanogen bromide solution with stirring. The pH is brought to 10.5 by the addition of 0.2

M potassium hydroxide and maintained between pH 9.5 and 10.5 by the addition of 0.2 M potassium hydroxide until the reaction was complete, as shown by a tendency for the pH to maintain alkaline values. The pH was then adjusted to 8.6 by adding 0.06 M Tris, pH 8.6; and the reaction mixture was transferred to ice. Human pituitary homogenate (500 $\mu$l.) containing human growth hormone as determnied by radioimmunoassay was then added with stirring; after 5 minutes, the reaction mixture was transferred to dialysis tubing and dialyzed exhaustively against changes of distilled water at 4° C.

Analytical polyacrylamide disc gel electrophoresis demonstrated the N-acetylneuraminyl human growth hormone migrating as a single band anodally more rapidly than native human growth hormone. This confirmed an increased net negative surface charge of the modified hormone.

Radioimmunoassay showed the N-acetylneuraminyl growth hormone to have less than 2% of the affinity for anti-human growth hormone antibodies than the unaltered hormone.

This material may be used to stimulate growth in pituitary insufficiency by administering a dose with activity equivalent to 2–4 mg. of the Raben preparation intramuscularly 3 times per week on alternate days.

EXAMPLE 9

Gluconyl human growth hormone

Following the procedure of Example 8, but substituting 30 mg. potassium gluconate for N-acetylneuraminic acid, the gluconyl growth hormone is obtained.

We claim:

1. An acidic monosaccharide-substituted protein selected from the group consisting of N-acetylneuraminyl insulin (bovine), N-acetylneuraminyl insulin (porcine), N-acetylneuraminyl human serum albumin, N-acetylneuraminyl bovine serum albumin, N-acetylneuraminyl human growth hormone, gluconyl insulin (bovine); gluconyl insulin (porcine), gluconyl human serum albumin, and gluconyl human growth hormone wherein the substitution occurs at an available α-amino or ε-amino group.

References Cited

UNITED STATES PATENTS

| | | | |
|---|---|---|---|
| 3,679,653 | 7/1972 | Schuck et al. | 260—112.7 |
| 3,591,574 | 7/1971 | Fenichel et al. | 260—112.7 |

OTHER REFERENCES

Lindsay et al., Biochem. J., *121*, 737 (March 1971).

Bromer et al., Biochem., *6*, 2378 (1967).

Takita et al.: Prog. Antimicrob. Anticancer Chemother., *2*, 1031–6 (1970).

LEWIS GOTTS, Primary Examiner

R. J. SUYAT, Assistant Examiner

U.S. Cl. X.R.

260—112.7, 121; 424—177, 178; 260—112 R